(12) United States Patent
Iwahashi et al.

(10) Patent No.: US 6,928,978 B2
(45) Date of Patent: Aug. 16, 2005

(54) IN-CYLINDER DIRECT-INJECTION ENGINE AND CYLINDER HEAD

(75) Inventors: Takeshi Iwahashi, Toyota (JP); Motoki Ohtani, Toyota (JP); Takuya Ikoma, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/798,566

(22) Filed: Mar. 12, 2004

(65) Prior Publication Data

US 2004/0173181 A1 Sep. 9, 2004

(30) Foreign Application Priority Data

Mar. 13, 2003 (JP) .................................. 2003-067702

(51) Int. Cl.[7] .................................................. F02B 5/00
(52) U.S. Cl. ........................ 123/298; 123/302; 123/305
(58) Field of Search ................................ 123/298, 302, 123/305

(56) References Cited

U.S. PATENT DOCUMENTS

| | | | | |
|---|---|---|---|---|
| 5,259,348 A | * | 11/1993 | Kobayashi et al. | ......... 123/305 |
| 5,816,215 A | * | 10/1998 | Yoshikawa et al. | ......... 123/302 |
| 5,908,018 A | * | 6/1999 | Suzuki | ......... 123/302 |
| 5,927,244 A | * | 7/1999 | Yamauchi et al. | ......... 123/298 |
| 6,334,427 B1 | * | 1/2002 | Nakayama et al. | ......... 123/305 |
| 6,782,867 B2 | * | 8/2004 | Nakayama et al. | ......... 123/305 |

FOREIGN PATENT DOCUMENTS

| | | |
|---|---|---|
| JP | 06-081657 | 3/1994 |
| JP | 10-008970 | 1/1998 |

* cited by examiner

*Primary Examiner*—Erick Solis
(74) *Attorney, Agent, or Firm*—Kenyon & Kenyon

(57) ABSTRACT

When an inner wall of a cylinder head is viewed along an axis of a cylinder, a line that passes through a center of a fuel injection port and a center of a valve opening adjacent to the injection port is defined as a first line, and a line that is perpendicular to the first line is defined as a second line. A notch is formed in a part of the inner wall that defines the injection port. Specifically, when the inner wall is divided into sections by the second line, the notch is located in the section in which the adjacent opening exists. The notch is also displaced from the first line. Therefore, a sufficient thickness of the section corresponding to the valve seats of intake and exhaust valves are easily ensured.

18 Claims, 3 Drawing Sheets

US 6,928,978 B2

IN-CYLINDER DIRECT-INJECTION ENGINE AND CYLINDER HEAD

BACKGROUND OF THE INVENTION

The present invention relates to an in-cylinder direct-injection engine and a cylinder head.

A typical inner wall of the cylinder head of an in-cylinder direct-injection engine has valve openings that are opened and closed with intake and exhaust valves, and an injection port for allowing fuel injected by an injector to enter the cylinder. Part of the inner wall about each valve opening forms a valve seat that contacts the corresponding valve.

The inner wall of a cylinder head disclosed in Japanese Laid-Open Patent Publication No. 6-81657 has a notch extending from an injection port. The notch prevents fuel injected from the injector from colliding with the cylinder head, that is, from interfering with the cylinder head. In the technique disclosed in the publication, the injection port is located in a part of the inner wall that is close to the periphery of the cylinder. The injector injects fuel in a direction away from the valve openings. The notch extends in a direction away from the valve openings to correspond to the injection direction.

The technique of the above publication permits a notch to be formed only for preventing injected fuel from interfering with the cylinder head. However, depending on the direction of the fuel injection, forming a notch can result in an insufficient thickness of the cylinder head at a valve seat about a valve opening adjacent to the injection port.

SUMMARY OF THE INVENTION

Accordingly, it is an objective of the present invention to provide an in-cylinder direct-injection engine and a cylinder head that guarantee a sufficient thickness of the cylinder head at a valve seat.

To achieve the above-mentioned objective, the present invention provides an engine. The engine includes a cylinder block having a cylinder. A cylinder head is attached to the cylinder block. The cylinder head has an inner wall that closes an opening of the cylinder. The engine further includes at least one intake valve provided in the cylinder head and at least one exhaust valve provided in the cylinder head. An injector is provided in the cylinder head. The injector injects fuel into the cylinder. The inner wall of the cylinder head has at least two valve openings, an injection port, and a notch. Each valve opening corresponds to one of the intake and exhaust valves, and is opened and closed by the corresponding valve. Fuel injected by the injector passes through the injection port. The notch is formed in a part of the inner wall that defines the injection port. The notch prevents fuel injected by the injector from interfering with the cylinder head. When the inner wall is viewed along an axis of the cylinder, a line that passes through a center of the injection port and a center of one of the valve openings that is adjacent to the injection port, or the center of an adjacent valve opening, is defined as a first line, and a line that is perpendicular to the first line is defined as a second line. When the inner wall is divided into sections by the second line, the notch is located in the section in which the adjacent opening exists. The notch is displaced from the first line.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
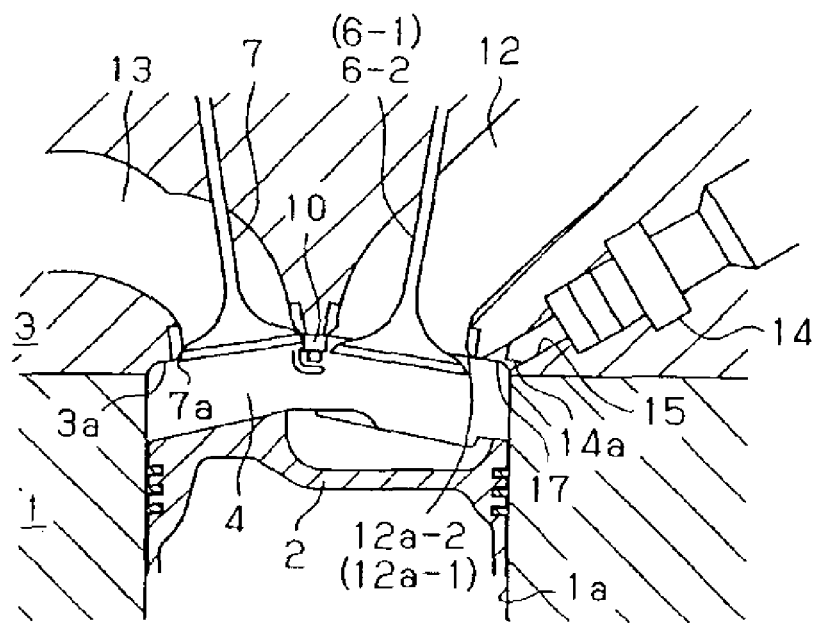
FIG. 1 is a cross-sectional view illustrating a combustion chamber and the surrounding portion of an in-cylinder direct-injection engine according to one embodiment of the present invention.

As shown in FIG. 1, an in-cylinder direct-injection engine includes a cylinder block 1 having a cylinder 1a, a piston 2 that reciprocates in the cylinder 1a, and a cylinder head 3 fixed to the upper end face of the cylinder block 1. The upper end face of the piston 2 and an inner wall 3a of the cylinder head 3 define a combustion chamber 4 in the cylinder 1a.

Figure 3A:
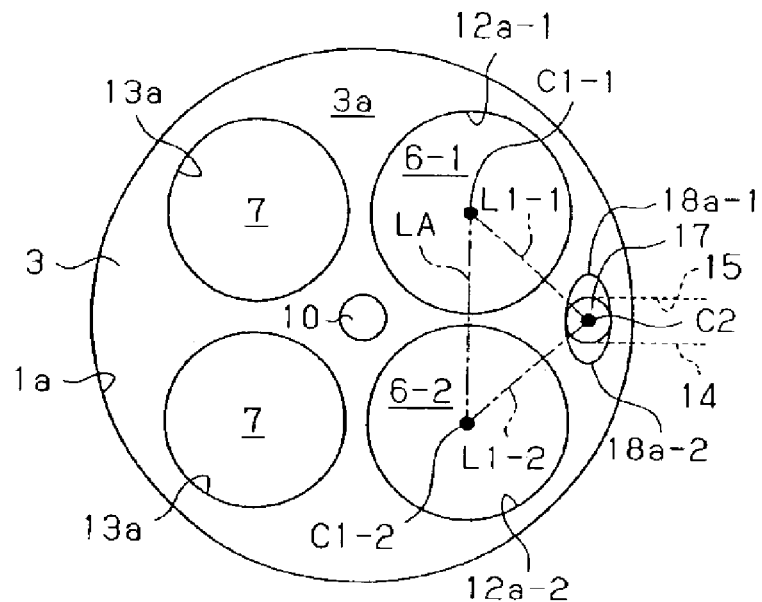
FIG. 3(A) is a view illustrating the inner wall of the cylinder head of FIG. 1, as viewed from the piston.

As shown in FIGS. 1 and 3(A), the cylinder head 3 has a first intake valve 6-1, a second intake valve 6-2, and a pair of exhaust valves 7. As viewed in FIG. 3(A), the first intake valve 6-1 is located in an upper section, and the second intake valve 6-2 is located in a lower section. The inner wall 3a of the cylinder head 3 has a first intake opening 12a-1, a second intake opening 12a-2, and a pair of exhaust openings 13a. The first intake opening 12a-1 is opened and closed by the first intake valve 6-1. The second intake opening 12a-2 is opened and closed by the second intake valve 6-2. The exhaust openings 13a are opened and closed by the exhaust valves 7.

A valve seat is formed about each of the valve openings 12a-1, 12a-2, 13a. Each of the valves 6-1, 6-2, 7 contacts the corresponding valve seat. A spark plug 10 is located in a part of the inner wall 3a that substantially corresponds to the axis of the cylinder 1a. The openings 12a-1, 12a-2, 13a are located about the spark plug 10. The intake openings 12a-1, 12a-2 are adjacent to each other, and the exhaust openings 13a are adjacent to each other. The cylinder head 3 has a pair of intake ports 12 that extend from the intake openings 12a-1, 12a-2, respectively. The cylinder head 3 also has a pair of exhaust ports 13 that extend from the exhaust openings 13a.

The cylinder head 3 has an injector accommodating hole 15 at the opposite side of the intake ports 12 with respect to the spark plug 10. An injector 14 is accommodated in the injector accommodating hole 15. The inner wall 3a of the cylinder head 3 has an injection port 17 for connecting the injector accommodating hole 15 with the combustion chamber 4. The injection port 17 is located at a part of the inner wall 3a that is close to the periphery of the cylinder 1a. The injection port 17 is adjacent to and equally spaced from the intake openings 12a-1 and 12a-2.

Figure 2:
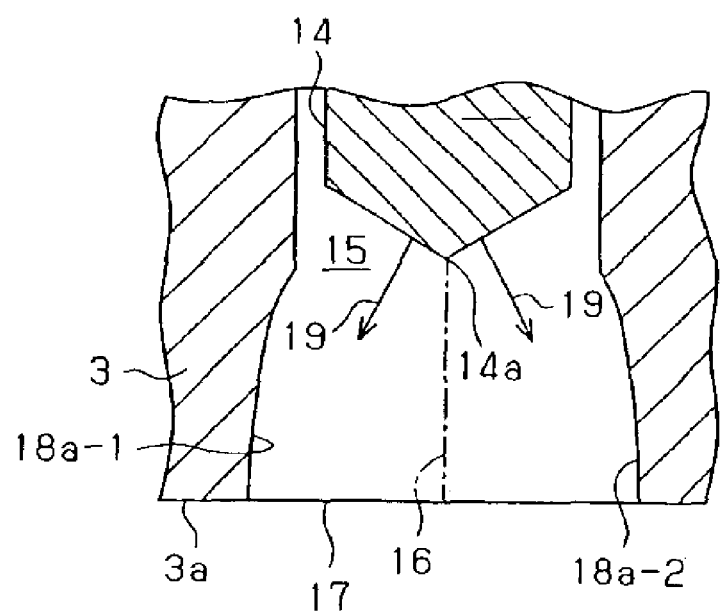
FIG. 2 is an enlarged view along a cross-section different from FIG. 1, illustrating the injector and the injection port of the cylinder head shown in FIG. 1.

As shown in FIGS. 1 and 2, a portion of the injector 14 from which fuel is injected, or a distal end 14a, is recessed in the cylinder head 3 relative to the inner wall 3a. The distal end 14a faces the combustion chamber 4 through the injection port 17, and injects fuel into the combustion chamber 4 through the injection port 17. In FIG. 2, an axis 16 of the injector accommodating hole 15 is indicated by alternate long and short dash line. The injector 14 injects fuel in directions 19 that are inclined relative to the axis 16.

As the piston 2, the intake valves 6-1, 6-2, the exhaust valves 7, the spark plug 10, and the injector 14 operate by a predetermined timing, suction, compression, combustion, and exhaust strokes are repeated to generate power of the engine.

As shown in FIG. 2, a first notch 18a-1 and a second notch 18a-2 are formed in parts of the wall surface defining the injection port 17 that face fuel injected by the injector 14. Each of the notches 18a-1, 18a-2 extends along the axis 16 from the inner wall 3a to a section that corresponds to the distal end 14a of the injector 14.

As shown in FIG. 3(A), when the inner wall 3a is viewed along an axial direction of the cylinder 1a, that is, when the inner wall 3a is viewed from the piston 2, a straight line connecting centers C1-1, C1-2 of the intake openings 12a-1, 12a-2 is referred to as a line LA. On the inner wall 3a, the injection port 17 is located radially outside of the line LA in the cylinder 1a. The notches 18a-1, 18a-2 extend parallel to the line LA and in opposite directions from the injection port 17 by 180° with respect to each other. The first notch 18a-1 extends upward from the injection port 17 as viewed in FIG. 3(A). The second notch 18a-2 extends downward from the injection port 17 as viewed in FIG. 3(A). The injector 14 injects fuel along a direction in which the first notch 18a-1 extends relative to the injection port 17 and a direction in which the second notch 18a-2 extends relative to the injection port 17.

The notches 18a-1, 18a-2 prevent fuel from the injector 14 from interfering with the cylinder head 3, or wall surfaces defining the injection port 17. Therefore, fuel sprayed by the injector 14 is efficiently mixed with air in the combustion chamber 4 and then combusted in a favorable manner.

Figure 3B:
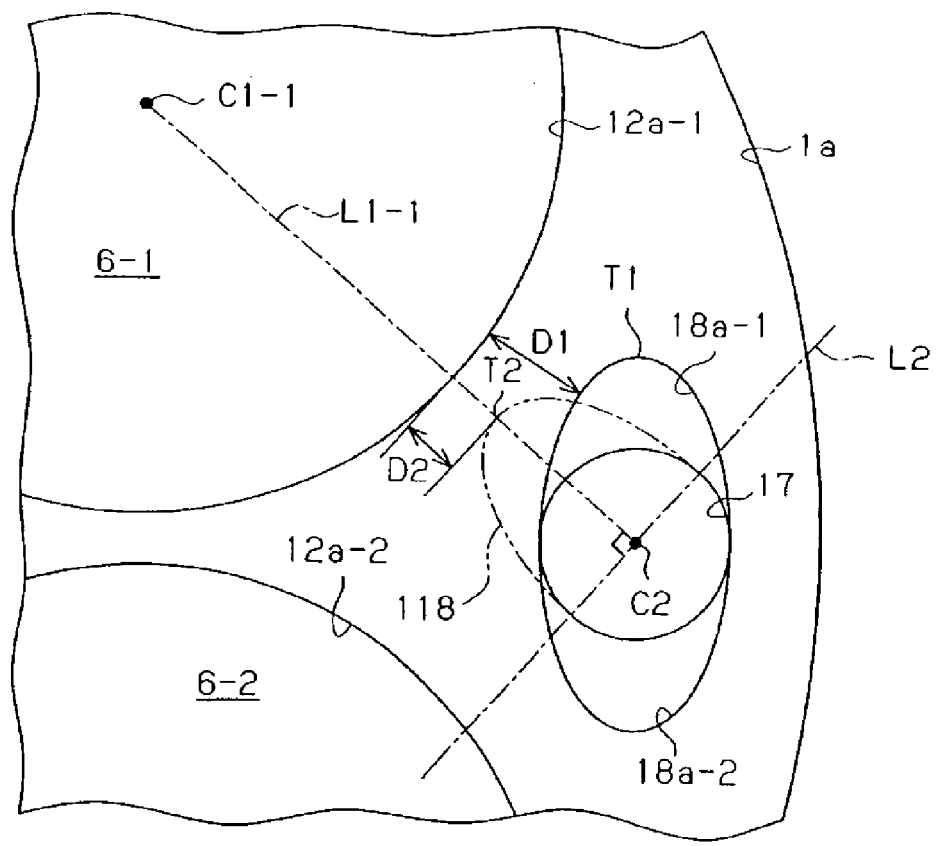
FIG. 3(B) is an enlarged view illustrating the injection port and the surrounding portion of the cylinder head shown in FIG. 3(A)

As shown in FIG. 3(B), when the inner wall 3a is viewed along the axial direction of the cylinder 1a, a straight line connecting a center C2 of the injection port 17 and the center C1-1 of the first intake opening 12a-1 is referred to as a first line L1-1, a line that extends from the center C2 and is perpendicular to the first line L1-1 is referred to as a second line L2.

Suppose the inner wall 3a is divided into sections by the second line L2, the first notch 18a-1 is located in the section in which the first intake opening 12a-1 exists. The first notch 18a-1 is displaced from the first line L1-1. That is, the first notch 18a-1 is oriented in a direction between the first line L1-1 and the second line L2. In other words, the first notch 18a-1 is displaced from a direction from the injection port 17 toward the center of the first intake valve 6-1. Put another way, the first notch 18a-1 is displaced from a straight line connecting the axis 16, which coincides with the axis of the injector 14, and the axis of the first intake valve 6-1.

As a comparison example, an imaginary notch 118 is shown in FIG. 3(B). The imaginary notch 118 has the same size as the first notch 18a-1. Suppose the inner wall 3a is divided into sections by the second line L2, the imaginary notch 118 is located in the section in which the first intake opening 12a-1 exists. Also, the imaginary notch 118 extends along the first line L1-1. The shortest distance D1 from the first notch 18a and the first intake opening 12a-1 is longer than the shortest distance D2 from the imaginary notch 118 to the first intake opening 12a-1. Therefore, the first notch 18a-1 prevents the thickness of a section corresponding to the valve seat of the first intake valve 6-1 from being reduced. Therefore, a sufficient thickness of the section corresponding to the valve seat of the first intake valve 6-1 is easily ensured.

"A state in which the first notch 18a-1 is displaced from the first line L1-1" does not refer to a state in which the first notch 18a-1 does not overlap the first line L1-1 at all, but refers to a state in which the apex T1 of the first notch 18a-1, that is, a section that is farthest from the injection port 17, is displaced from the first line L1-1, that is, from the apex T2 of the imaginary notch 118.

As shown in FIG. 3(A), when the inner wall 3a is divided by a line that is perpendicular to the first line L1-2, which passes through the center C1-2 of the second intake opening 12a-2 and the injection center C2, the second notch 18a-2 is located in the section in which the second intake valve 6-2 exists. Also, the second notch 18a-2 is displaced from the first line L1-2. Therefore, the thickness of a section corresponding to the valve seat of the second intake valve 6-2 is prevented from being reduced.

Particularly, in this embodiment, the distal end 14a of the injector 14 is recessed in the cylinder head 3 with respect to the inner wall 3a so that the distal end 14a is not exposed to high temperature combusted gas, that is, so that deposit is prevented from collecting on the distal end 14a. Therefore, to prevent injected fuel from interfering with the cylinder head 3, the notches 18a-1, 18a-2 need to be larger than a case where the distal end 14a is located in the same plane as the inner wall 3a. Since notches 18a-1, 18a-2 are both displaced from the first lines L1-1, L1-2, the requirement for a sufficient thickness of the sections corresponding to the valve seats of the intake valves 6-1, 6-2 and the requirement for sufficient sizes of the notches 18a-1, 18a-2 are simultaneously satisfied.

To satisfy the requirement of a sufficient thickness of the sections corresponding to the valve seats of the intake valves 6-1, 6-2, the sizes of the notches 18a-1, 18a-2 are preferably minimized in a range that prevents injected fuel interfering the cylinder head 3. Therefore, the shapes and the sizes of the notches 18a-1, 18a-2 are determined in consideration of the area of fuel sprayed from the injector. When considering the area of sprayed fuel, it is preferable to consider the fact that sprayed fuel in the combustion chamber 4 acts according to the engine load and the engine speed and in a manner different from a state under the atmospheric pressure.

The invention may be embodied in the following forms.

Figure 3C:
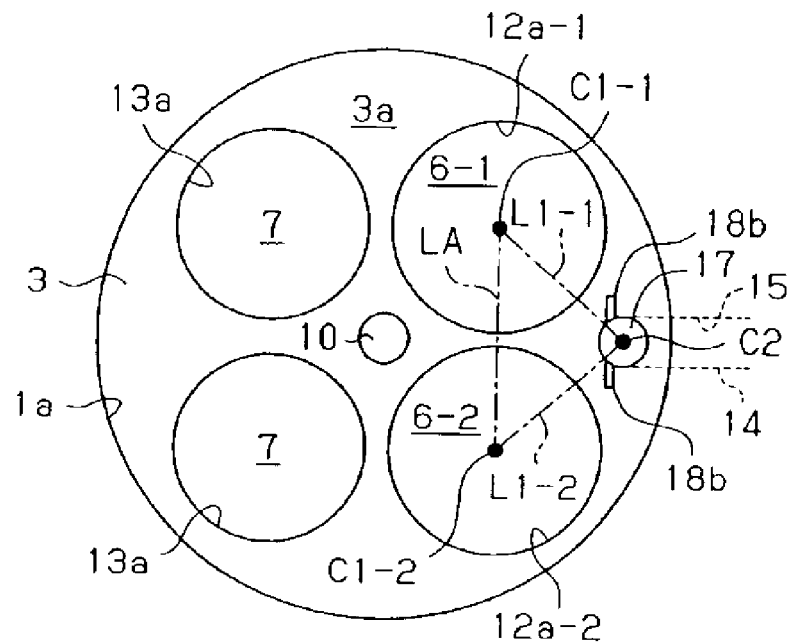
FIG. 3(C) is a view illustrating the inner wall of a cylinder head according to a modified embodiment of the present embodiment.
Figure 3D:
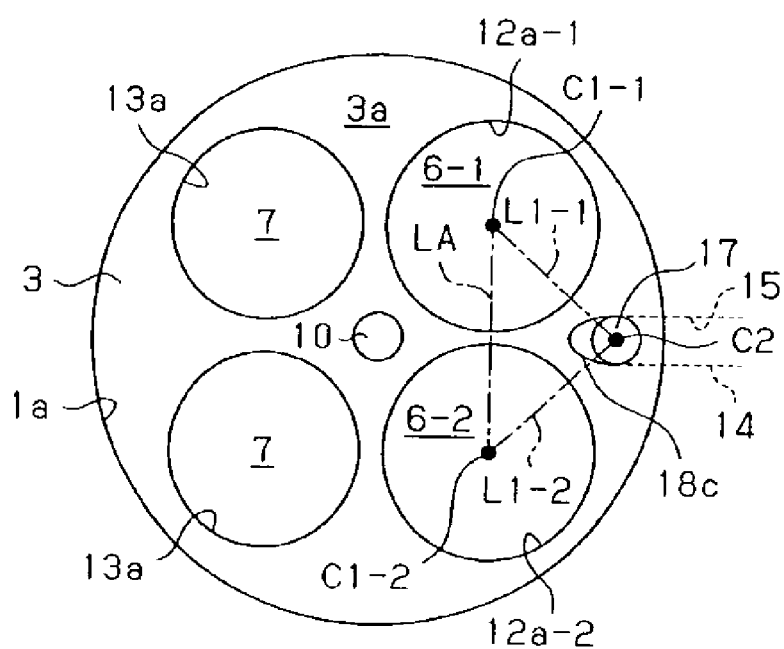
FIG. 3(D) is a view illustrating the inner wall of a cylinder head according to another modified embodiment of the present embodiment.

The notches 18a-1, 18a-2 may be modified as shown in FIGS. 3(C) and 3(D). In the modification of FIG. 3(C), a pair of notches 18b are like thin slits and extend substantially parallel to the line LA.

In the modification of FIG. 3(D), a single notch 18c extends toward a space between the intake openings 12a-1 and 12a-2. That is, the notch 18c extends toward the spark plug 10. In other words, the notch 18c extends perpendicular to the line LA. In this case, the injector 14 injects fuel toward the space between the intake openings 12a-1, 12a-2. That is, fuel is injected toward the center of the inner wall 3a as viewed along an axis of the cylinder 1a.

The number of the injector 14 in the cylinder head 3 is not limited to one. That is, two or more injectors may be provided in the cylinder head 3.

Only one intake valve or three or more intake valves may be provided in the cylinder head 3. Likewise, only one exhaust valve or three or more exhaust valves may be provided.

The injection port 17 may be located adjacent to the exhaust valves 7. Alternatively, the injection port 17 may be located adjacent to both of the intake valve 6 and the exhaust valve 7.

The present examples and embodiments are to be considered as illustrative and not restrictive and the invention is not to be limited to the details given herein, but may be modified within the scope and equivalence of the appended claims.

What is claimed is:

1. An engine, comprising:
    a cylinder block having a cylinder;
    a cylinder head attached to the cylinder block, wherein the cylinder head has an inner wall that closes an opening of the cylinder;
    at least one intake valve provided in the cylinder head;
    at least one exhaust valve provided in the cylinder head; and
    an injector provided in the cylinder head, wherein the injector injects fuel into the cylinder,
    wherein the inner wall of the cylinder head has at least two valve openings, an injection port, and a notch, wherein each valve opening corresponds to one of the intake and exhaust valves, and is opened and closed by the corresponding valve, wherein fuel injected by the injector passes through the injection port, wherein the notch is formed in a part of the inner wall that defines the injection port, and wherein the notch prevents fuel injected by the injector from interfering with the cylinder head,
    wherein, when the inner wall is viewed along an axis of the cylinder, a line that passes through a center of the injection port and a center of one of the valve openings that is adjacent to the injection port, or the center of an adjacent valve opening, is defined as a first line, and a line that is perpendicular to the first line and passes the center of the injection port is defined as a second line, and wherein, when the inner wall is divided into sections by the second line, the notch is located in the section in which the adjacent valve opening exists, and the notch is displaced from the first line,
    wherein the injection port is located in a part of the inner wall that is close to the periphery of the cylinder, and
    wherein the notch has a nearest portion, which is nearest to the adjacent valve opening, and the nearest portion is displaced from the first line.

2. The engine according to claim 1, wherein, when the inner wall is viewed along the axis of the cylinder, the notch is oriented from the injection port toward a space between the first line and the second line, and wherein the injector injects fuel along the notch.

3. The engine according to claim 1, wherein the injector has a fuel injection portion that is directed to the injection port, and wherein the fuel injection portion is recessed in the cylinder head with respect to the inner wall.

4. The engine according to claim 1, wherein the notch is one of a plurality of notches.

5. The engine according to claim 1, wherein the adjacent valve opening is one of a pair of adjacent valve openings, and wherein the notch extends from the injection port and is parallel to a line that passes through centers of the adjacent valve openings.

6. The engine according to claim 1, wherein the adjacent valve opening is one of a plurality of adjacent valve openings, and wherein the notch extends from the injection port toward a space between the adjacent valve openings.

7. The engine according to claim 1, wherein the notch is formed like a slit.

8. The engine according to claim 1, wherein, when the inner wall is viewed along the axis of the cylinder, the section in which the adjacent valve opening exists is divided into two parts by the first line, and the notch extends from the injection port toward only one of the two parts.

9. The engine according to claim 1, wherein the cylinder head has an injector accommodating hole accommodating the injector, wherein the injection port connects the injector accommodating hole with the combustion chamber, wherein the injector injects fuel in a direction that is inclined relative to the axis of the injector accommodating hole, and the notch extends along the direction of the fuel injection.

10. A cylinder head having an inner wall that closes an opening of a cylinder of an engine,
    wherein an injector is provided in the cylinder head, wherein the injector injects fuel into the cylinder, wherein the inner wall of the cylinder head has at least two valve openings, an injection port, and a notch, wherein one of the valve openings is opened and closed by at least one intake valve, and the other valve opening is opened and closed by at least one exhaust valve, wherein fuel injected by the injector passes through the injection port, wherein the notch is formed in a part of the inner wall that defines the injection port, and wherein the notch prevents fuel injected by the injector from interfering with the cylinder head,
    wherein, when the inner wall is viewed along an axis of the cylinder, a line that passes through a center of the injection port and a center of one of the valve openings that is adjacent to the injection port, or the center of an adjacent valve opening, is defined as a first line, and a line that is perpendicular to the first line and passes the center of the injection port is defined as a second line, and wherein, when the inner wall is divided into sections by the second line, the notch is located in the section in which the adjacent valve opening exists, and the notch is displaced from the first line,
    wherein the injection port is located in a part of the inner wall that is close to the periphery of the cylinder, and
    wherein the notch has a nearest portion, which is nearest to the adjacent valve opening, and the nearest portion is displaced from the first line.

11. The cylinder head according to claim 10, wherein, when the inner wall is viewed along the axis of the cylinder, the notch is oriented from the injection port toward a space between the first line and the second line, and wherein the injector injects fuel along the notch.

12. The cylinder head according to claim 10, wherein the notch extends inward in the cylinder.

13. The cylinder head according to claim 12, wherein the injector has a fuel injection portion that is recessed in the cylinder head with respect to the inner wall, and wherein the notch reaches the fuel injection portion.

14. The cylinder head according to claim 10, wherein the notch is one of a plurality of notches.

15. The cylinder head according to claim 10, wherein the adjacent valve opening is one of a pair of adjacent valve openings, and wherein the notch extends from the injection port and is parallel to a line that passes through centers of the adjacent valve openings.

16. The cylinder head according to claim 10, wherein the adjacent valve opening is one of a plurality of adjacent valve openings, and wherein the notch extends from the injection port toward a space between the adjacent valve openings.

17. The cylinder head according to claim 10, wherein the notch is formed like a slit.

18. The cylinder head according to claim 10, wherein the injection port is located in a part of the inner wall that is close to the periphery of the cylinder.

* * * * *